US010291996B1

(12) United States Patent
Shaffer et al.

(10) Patent No.: US 10,291,996 B1
(45) Date of Patent: May 14, 2019

(54) VEHICLE MULTI-PASSENGER PHONE MODE

(71) Applicant: Ford Global Technologies, LLC, Dearborn, MI (US)

(72) Inventors: Christian Edward Shaffer, Canton, MI (US); Ryan Andrew Sikorski, Dearborn, MI (US)

(73) Assignee: FORD GLOBAL TEHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/870,150

(22) Filed: Jan. 12, 2018

(51) Int. Cl.

| | |
|---|---|
| ***H04R 29/00*** | (2006.01) |
| ***H04R 1/40*** | (2006.01) |
| ***H04R 3/00*** | (2006.01) |
| ***H04M 1/60*** | (2006.01) |
| ***B60N 2/00*** | (2006.01) |
| ***G10L 15/22*** | (2006.01) |

(52) U.S. Cl.
CPC ........... *H04R 29/005* (2013.01); *B60N 2/002* (2013.01); *G10L 15/22* (2013.01); *H04M 1/6083* (2013.01); *H04R 1/406* (2013.01); *H04R 3/005* (2013.01); *G10L 2015/223* (2013.01); *H04R 2499/13* (2013.01)

(58) Field of Classification Search
CPC .. H04R 29/005; H04R 1/406; H04R 2499/13; H04R 3/005; B60N 2/002; H04M 1/6083; G10L 15/22; G10L 2015/223
USPC .......................... 381/71.4, 86, 302, 365, 389
See application file for complete search history.

(56) References Cited

U.S. PATENT DOCUMENTS

| | | | | |
|---|---|---|---|---|
| 8,275,145 | B2 * | 9/2012 | Buck | H04R 27/00 381/119 |
| 9,620,146 | B2 * | 4/2017 | Buck | H04R 3/005 |
| 9,743,213 | B2 * | 8/2017 | Mohammad | H04R 5/02 |
| 9,924,011 | B2 * | 3/2018 | Lee | H04M 1/6091 |
| 2008/0273725 | A1 * | 11/2008 | Hartung | H04R 1/403 381/302 |
| 2009/0055178 | A1 * | 2/2009 | Coon | B60R 16/0373 704/246 |
| 2012/0197637 | A1 * | 8/2012 | Gratke | G10L 21/02 704/226 |
| 2012/0201396 | A1 * | 8/2012 | Schmidt | G10L 21/02 381/71.1 |
| 2015/0120305 | A1 * | 4/2015 | Buck | H04R 3/005 704/275 |
| 2016/0065710 | A1 * | 3/2016 | Lee | H04M 1/6091 455/41.3 |
| 2016/0080861 | A1 * | 3/2016 | Helm | B60R 11/0247 381/86 |
| 2017/0076562 | A1 * | 3/2017 | Hicks, III | G08B 7/06 |

* cited by examiner

*Primary Examiner* — William A Jerez Lora
(74) *Attorney, Agent, or Firm* — Frank Lollo; Brooks Kushman P.C.

(57) ABSTRACT

A vehicle includes one or more microphones that are each configured to selectively provide sound signals from one or more seating positions in the vehicle. A controller is programmed to receive an input indicative of a request to enter a group conversation mode upon initiation of a call, and, responsive to receiving the input, enable the microphones to selectively provide sound signals from all of the seating positions.

20 Claims, 5 Drawing Sheets

VEHICLE MULTI-PASSENGER PHONE MODE

TECHNICAL FIELD

This application generally relates to a system for selectively enabling microphones for a vehicle communication system.

BACKGROUND

Modern vehicles are expected to provide voice capability for a variety of functions. For example, mobile telecommunications and handsfree vehicle functions require voice inputs to operate. Vehicles typically include a communication system that is optimized for the driver. Such systems provide limited performance for other passengers as the voice interface is optimized for the driver position. Voice signals from other seating positions are attenuated and cannot be heard clearly through the communication link.

SUMMARY

A vehicle includes one or more microphones, each configured to selectively provide sound signals from one or more of a plurality of seating positions. The vehicle further includes a controller programmed to receive an input indicative of a request to enter a group conversation mode upon initiation of a call, and, responsive to receiving the input, enable the microphones to selectively provide sound signals from all of the seating positions.

The vehicle may further include a user interface configured to, upon initiation of the call, provide an operator with a selection for entering the group conversation mode, and provide the input according to the selection. The vehicle may further include a switch for initiating a call, and the request to enter the group conversation mode is responsive to the switch being pressed for a time exceeding a predetermined time. The vehicle may further include a plurality of occupancy sensors associated with each of the seating positions, and the request to enter the group conversation mode is responsive to more than one of the occupancy sensors being indicative of an occupant in a corresponding seating position. The controller may be further programmed to recognize voice commands and the request to enter the group conversation mode is responsive to receiving sound signals indicative of a command to enter the group conversation mode. The controller may be further programmed to, responsive to not receiving the request, enable only the microphone associated with a driver seating position. The microphones may be unidirectional microphones that are associated with each of the seating positions. The microphones may include at least one omnidirectional microphone that is configured to selectively provide sound signals from one or more of the seating positions.

A vehicle communication system includes a plurality of microphones configured to provide sound signals from one of a plurality of seating positions. The vehicle communication system further includes a controller programmed, responsive to a switch press, for initiating a call, exceeding a predetermined duration, change from a normal mode in which only one of the microphones associated with a driver position is enabled to a group mode in which microphones associated with all seating positions are enabled for the call.

The microphones may include a unidirectional microphone that is associated with the driver position. The microphones may include an omnidirectional microphone that is associated with seating positions other that the driver position. The controller may be further programmed to, responsive to a second switch press, for changing a call mode, change from the group mode to the normal mode. The vehicle communication system may further include an occupancy sensor for each of the seating positions, and wherein the controller is further programmed to, responsive to being in the group mode, enable the microphones only for the seating positions in which the occupancy sensor indicates an occupant. The controller may be further programmed to recognize voice commands and, responsive to receiving sound signals indicative of a command to enter the group mode, change from the normal mode to the group mode. The vehicle communication system may further include a user interface configured to, upon initiating the call, provide an operator with a selection for entering the group mode, and, responsive to the operator choosing the selection, change from the normal mode to the group mode.

A method includes enabling, by a controller, a microphone associated with a driver position responsive to a switch press. The method includes receiving, by the controller, a voice command from the microphone and interpreting the voice command. The method includes enabling, by the controller, microphones associated with seating positions other than the driver position responsive to the voice command being a request to initiate a call in a group mode.

The method may further include enabling microphones associated with other seating positions responsive to a switch, for receiving an incoming call, being pressed for a duration exceeding a predetermined duration. The method may further include enabling microphones associated with other seating positions responsive to a switch, for initiating an outgoing call, being pressed for a duration exceeding a predetermined duration. The method may further include receiving, by the controller, occupancy sensor data associated with each of the seating positions and enabling microphones associated with seating positions at which the occupancy sensor data is indicative of an occupant. The method may further include receiving, by the controller, an input, from a user interface, indicative of a request to enter the group mode and enabling microphones associated with other seating positions responsive to the input.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
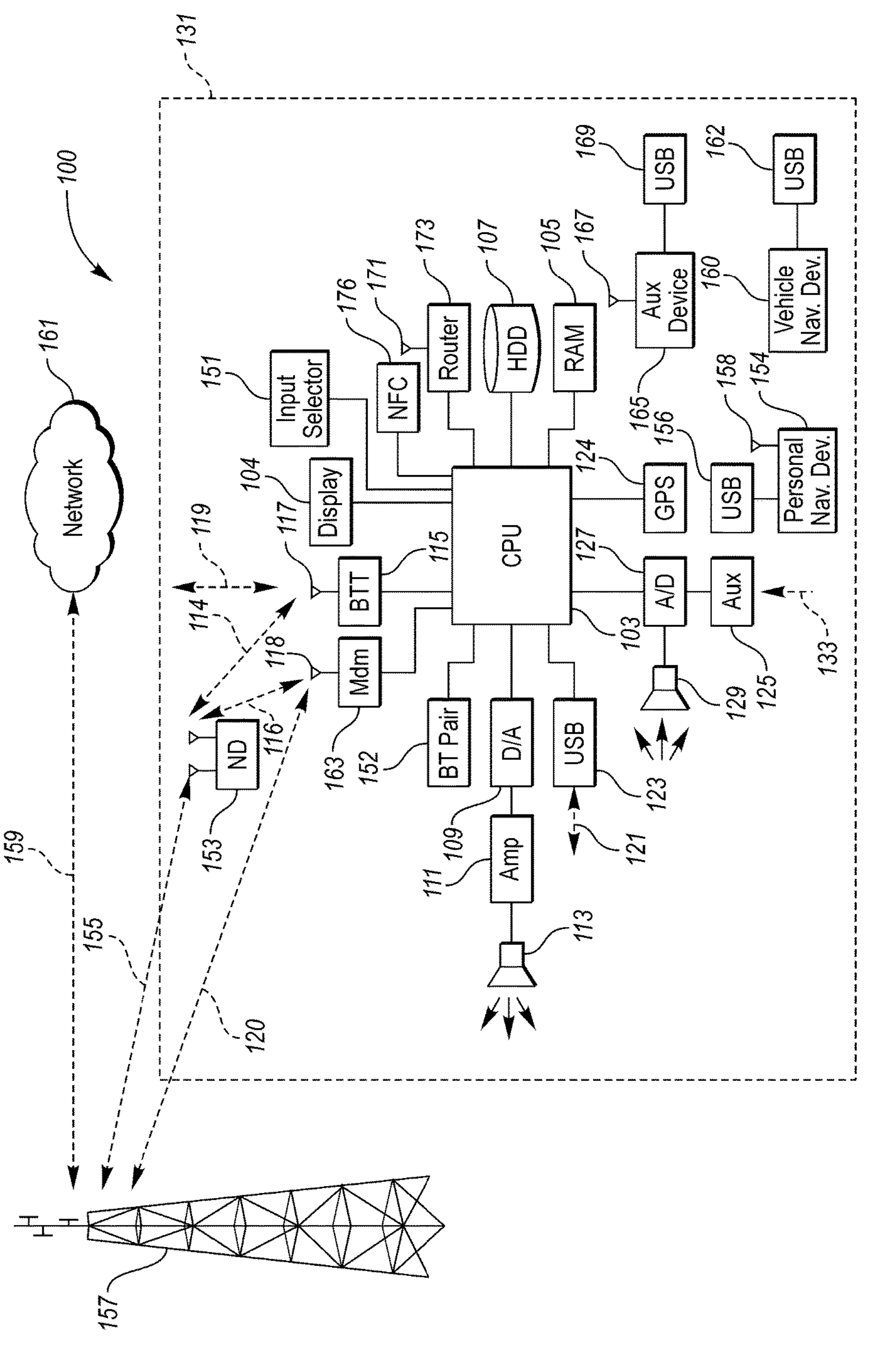
FIG. 1 is a possible configuration of a vehicle communication system.

FIG. 1 illustrates an example block topology for a vehicle-based computing system 100 (VCS) for a vehicle 131. An example of such a vehicle-based computing system 100 is the SYNC system manufactured by THE FORD MOTOR COMPANY. The vehicle 131 enabled with the vehicle-based computing system 100 may contain a visual front-end interface 104 located in the vehicle 131. The user may be able to interact with the interface 104 if it is provided, for example, with a touch sensitive screen. In another illustrative embodiment, the interaction occurs through, button presses, spoken dialog system with automatic speech recognition and speech synthesis.

In the illustrative embodiment shown in FIG. 1, at least one processor 103 controls at least some portion of the operation of the vehicle-based computing system 100. Provided within the vehicle 131, the processor 103 allows onboard processing of commands and routines. Further, the processor 103 is connected to both non-persistent 105 and persistent storage 107. In this illustrative embodiment, the non-persistent storage 105 is random access memory (RAM) and the persistent storage 107 is a hard disk drive (HDD) or flash memory. Non-transitory memory may include both persistent memory and RAM. In general, persistent storage 107 may include all forms of memory that maintain data when a computer or other device is powered down. These include, but are not limited to, HDDs, CDs, DVDs, magnetic tapes, solid state drives, portable USB drives and any other suitable form of persistent memory.

The processor 103 may also include several different inputs allowing the user and external systems to interface with the processor 103. The vehicle-based computing system 100 may include a microphone 129, an auxiliary input port 125 (for input 133), a Universal Serial Bus (USB) input 123, a Global Positioning System (GPS) input 124, a screen 104, which may be a touchscreen display, and a BLUETOOTH input 115. The VCS 100 may further include an input selector 151 that is configured to allow a user to swap between various inputs. Input from both the microphone 129 and the auxiliary connector 125 may be converted from analog to digital by an analog-to-digital (A/D) converter 127 before being passed to the processor 103. Although not shown, numerous of the vehicle components and auxiliary components in communication with the VCS may use a vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the VCS 100 (or components thereof).

Outputs from the processor 103 may include, but are not limited to, a visual display 104 and a speaker 113 or stereo system output. The speaker 113 may be connected to an amplifier 111 and receive its signal from the processor 103 through a digital-to-analog (D/A) converter 109. Outputs can also be made to a remote BLUETOOTH device such as a Personal Navigation Device (PND) 154 or a USB device such as vehicle navigation device 160 along the bi-directional data streams shown at 119 and 121 respectively.

In one illustrative embodiment, the system 100 uses the BLUETOOTH transceiver 115 with an antenna 117 to communicate with a user's nomadic device 153 (e.g., cell phone, smart phone, Personal Digital Assistance (PDA), or any other device having wireless remote network connectivity). The nomadic device 153 can then be used to communicate over a tower-network communication path 159 with a network 161 outside the vehicle 131 through, for example, a device-tower communication path 155 with a cellular tower 157. In some embodiments, tower 157 may be a wireless Ethernet or WiFi access point as defined by Institute of Electrical and Electronics Engineers (IEEE) 802.11 family of standards. Exemplary communication between the nomadic device 153 and the BLUETOOTH transceiver 115 is represented by Bluetooth signal path 114.

Pairing the nomadic device 153 and the BLUETOOTH transceiver 115 can be instructed through a button 152 or similar input. Accordingly, the CPU is instructed that the onboard BLUETOOTH transceiver 115 will be paired with a BLUETOOTH transceiver in a nomadic device 153.

Data may be communicated between CPU 103 and network 161 utilizing, for example, a data-plan, data over voice, or Dual Tone Multi Frequency (DTMF) tones associated with nomadic device 153. Alternatively, it may be desirable to include an onboard modem 163 having antenna 118 in order to establish a vehicle-device communication path 116 for communicating data between CPU 103 and network 161 over the voice band. The nomadic device 153 can then be used to communicate over the tower-network communication path 159 with a network 161 outside the vehicle 131 through, for example, device-tower communication path 155 with a cellular tower 157. In some embodiments, the modem 163 may establish a vehicle-tower communication path 120 directly with the tower 157 for communicating with network 161. As a non-limiting example, modem 163 may be a USB cellular modem and vehicle-tower communication path 120 may be cellular communication.

In one illustrative embodiment, the processor 103 is provided with an operating system including an application programming interface (API) to communicate with modem application software. The modem application software may access an embedded module or firmware on the BLUETOOTH transceiver 115 to complete wireless communication with a remote BLUETOOTH transceiver (such as that found in a nomadic device 153). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications systems such as RFID.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device 153, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device 153 may be a wireless local area network (LAN) device capable of communication over, for example (and without limitation), an IEEE 802.11g network (i.e., WiFi) or a WiMax network.

In one embodiment, incoming data can be passed through the nomadic device 153 via a data-over-voice or data-plan, through the onboard BLUETOOTH transceiver 115 and to the vehicle's internal processor 103. In the case of certain temporary data, for example, the data can be stored on the HDD or other storage media 107 until the data is no longer needed.

Additional sources that may interface with the vehicle 131 include a personal navigation device 154, having, for example, a USB connection 156 and/or an antenna 158, a vehicle navigation device 160 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 103 may be in communication with a variety of other auxiliary devices 165. The auxiliary devices 165 can be connected through a wireless (e.g., via auxiliary device antenna 167) or wired (e.g., auxiliary device USB 169) connection. Auxiliary devices 165 may include, but are not limited to, personal media players, wireless health devices, portable computers, and the like.

The CPU 103 may be connected to one or more Near Field Communication (NFC) transceivers 176. The NFC transceivers 176 may be configured to establish communication with compatible devices that are in proximity to the NFC transceivers 176. The NFC communication protocol may be useful for identifying compatible nomadic devices that are proximate the NFC transceivers 176.

Also, or alternatively, the CPU 103 may be connected to a vehicle-based wireless router 173, using for example a WiFi (IEEE 802.11) transceiver/antenna 171. This may allow the CPU 103 to connect to remote networks in range of the local router 173. In some configurations, the router 173 and the modem 163 may be combined as an integrated unit. However, features to be described herein may be applicable to configurations in which the modules are separate or integrated.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The vehicle-based computing system 100 described may be part of an infotainment system. The vehicle-based computing system 100 may be further programmed to interface with other vehicle controllers to exchange parameters and data. For example, the vehicle-based computing system 100 may implement a menu structure for setting parameters for other vehicle-based systems. The operator may traverse through the menu system to set various parameters for other controllers. The vehicle-based computing system 100 may communicate the parameters via the vehicle network.

In a typical vehicle configuration, the microphone 129 may be a unidirectional microphone that is configured to receive sounds from a driver seating position of the vehicle. Such a configuration allows for the driver's voice to be the primary sound signal. Noise signals caused by background chatter from other vehicle passengers and vehicle/road noises may be attenuated in this configuration. This configuration may work well when the driver is the intended speaking source. However, in some circumstances, voice input from all of the vehicle seating positions may be desirable. For example, a family in the vehicle speaking to relatives or co-workers riding in the vehicle participating in a conference call. In the traditional configuration, voice inputs from the other seating positions may be not pass as clearly through the communication system because the microphone is optimized for the driver position.

To improve communication from other seating positions, a new mode of operation may be implemented in the vehicle communication system. The new mode may be configured to allow for voice input from all seating positions upon making or receiving a call. The new mode may be referred to as group mode. The default mode may be referred to as single or driver mode. The following discussion may refer to initiating a call. Initiating a call may include receiving an incoming call and starting an outgoing call.

In the group mode, voice input from each of the seating positions in the vehicle may be processed. The voice inputs may be derived from one or more microphones. The microphones may be a plurality of unidirectional microphones pointed toward each of the seating positions. The microphones may be configured to optimize receiving sound from a particular seating position while attenuating input from the other seating positions. The microphones may be one or more omnidirectional microphones that are configured to receive voice input from one or more of the seating positions.

The driver mode may be selected under most conditions. For example, when the phone is not in use, the driver mode may be selected to ensure that driver commands are interpretable by the vehicle communication system. Further, when a call is made or received, it may be assumed that the driver is an intended participant. In the driver mode, a microphone is selected that is optimizes sound reception from the driver seating position.

Figure 2:
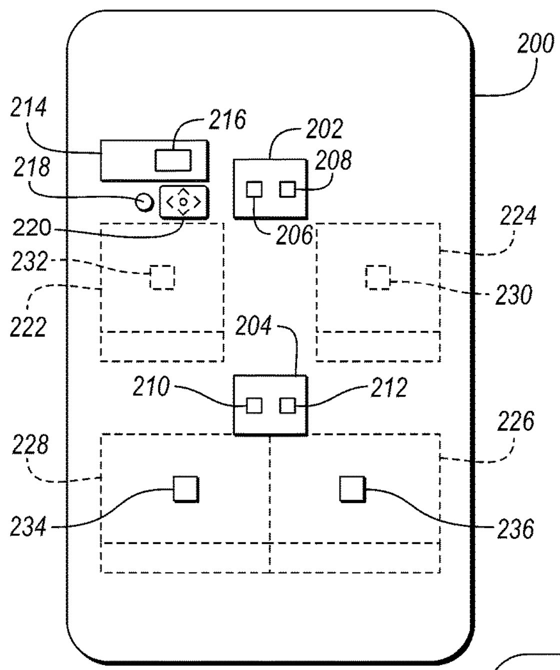
FIG. 2 is a possible configuration of a vehicle using unidirectional microphones.

The group mode feature relies on additional microphones. The group mode feature may be implemented with a variety of microphone configurations. In some configurations, a plurality of unidirectional microphones may be installed in the vehicle. FIG. 2 depicts a configuration of a vehicle 200 using unidirectional microphones. The vehicle 200 may include a front overhead console 202. The front overhead console 202 may include a driver-side microphone 206 and a passenger-side microphone 208. The driver-side microphone 206 and the passenger-side microphone 208 may be unidirectional microphones. The driver-side microphone 206 and the passenger-side microphone 208 may be electrically coupled to the CPU 103. The driver-side microphone 206 may be configured to optimize receiving sound signals from a driver seating position 222. The passenger-side microphone 208 may be configured to optimize receiving sound signals from a passenger seating position 224. In some configurations, the front overhead console 202 may be comprised of a separate console, one on the driver side proximate the driver seating position 222 and one on the passenger side proximate the passenger seating position 224.

The vehicle 200 may include a rear overhead console 204. The rear overhead console 204 may include a left-side microphone 210 and a right-side microphone 212. The left-side microphone 210 and a right-side microphone 212 may be coupled to the CPU 103. The left-side microphone 210 may be configured to optimize receiving sound signals from a rear left seating position 228. The right-side microphone 212 may be configured to optimize receiving sound signals from a rear right seating position 226. The rear overhead console 204 may be installed centrally in a ceiling or headliner of the vehicle 200. The left-side microphone 210 and a right-side microphone 212 may be unidirectional microphones. In some configurations, the rear overhead console 204 may be comprised of a separate console, one on the left side proximate the rear left seating position 228 and one on the right side proximate the rear right seating position 226. Note that the vehicle may include an additional row(s) of seating having similarly configured overhead consoles proximate the additional row(s).

The vehicle 200 may further include an instrument cluster 214 that is within view of the driver seating position 222. The instrument cluster 214 may include an instrument cluster display 216. For example, a liquid crystal display (LCD) may be embedded within the instrument cluster 214 and configured to display information to the driver. The instrument cluster 214 may include an associated controller to control and manage the functions of the instrument cluster 214. The associated controller may be in communication with the CPU 103. The vehicle 200 may include a call button or switch 218 that is configured for initiating a call. The call switch 218 may be electrically coupled to the associated controller and/or the CPU 103. The vehicle 200 may further include a multifunction button 220. The multifunction button 220 may include switches for moving a cursor or highlight in various directions and a central enter switch for selecting an option. The multifunction button 220 may be configured to provide input for moving a cursor or selection highlight in various directions. For example, the multifunction button 220 may be used for traversing menus and lists that are displayed on the instrument cluster display 216 and/or the infotainment display 104.

The vehicle 200 may include one or more occupancy sensors associated with each seating position. A driver-seat occupancy sensor 232 may be associated with the driver seating position 222. A passenger-seat occupancy sensor 230 may be associated with the passenger seating position 224. A rear right occupancy sensor 234 may be associated with the rear right seating position 226. A rear left occupancy sensor 236 may be associated with the rear left seating position 228. For example, the occupancy sensors may be part of an airbag system. The occupancy sensor may be implemented as weight sensors that are embedded in the seats to determine occupancy in the different seating positions. In other configurations, one or more cameras may be used as the occupancy sensor for each of the seating positions. The occupancy sensor inputs may also be used to determine seat occupancy for selecting between the driver and group modes. For example, the group mode may be selected when one of the occupancy sensors indicates that there is a passenger other than the driver in the vehicle. Selection based on the occupancy sensors may be configurable via a configuration screen of the vehicle communication system.

Figure 3:
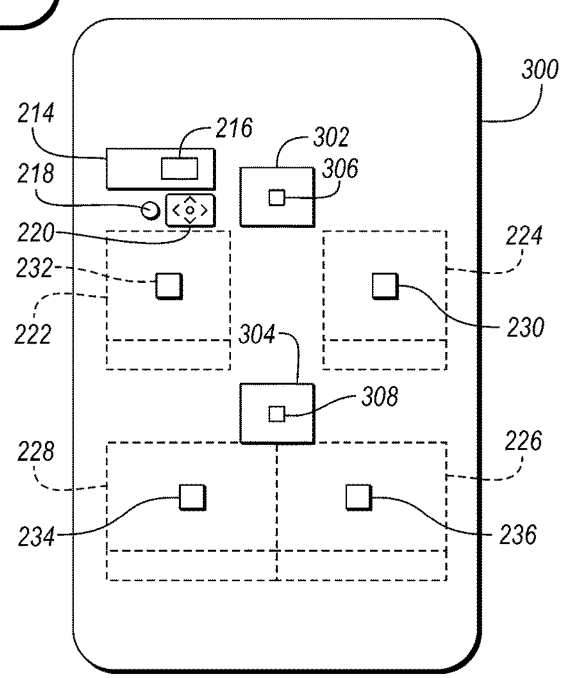
FIG. 3 is a possible configuration of a vehicle using selectable omnidirectional microphones.

FIG. 3 depicts a configuration for a vehicle 300 using omnidirectional microphones. The vehicle 300 may include a front overhead console 302. The front overhead console 302 may include a front omnidirectional microphone 306. The front omnidirectional microphone 306 may be electrically coupled to the CPU 103. The front omnidirectional microphone 306 may be configured to selectively provide sound signals from the driver seating position 222 and the passenger seating position 224.

The vehicle 300 may include a rear overhead console 304. The rear overhead console 304 may include a rear omnidirectional microphone 308. The rear omnidirectional microphone 308 may be coupled to CPU 103. The rear omnidirectional microphone 308 may be configured to selectively provide sound signals from the rear left seating position 228 and the rear right seating position 226.

Other configurations may include a switchable microphone that is capable of switching between unidirectional and omnidirectional modes of operation. The switchable microphone may be used in the front overhead console (e.g., 202, 302) and switched between a unidirectional microphone configured for driver input and an omnidirectional microphone configured for driver and front seat passenger input. Other configurations may include a dedicated unidirectional microphone for driver input and an omnidirectional microphone configured for input from the other seating positions. For example, the unidirectional microphone for the driver may be located in the front overhead console. The omnidirectional microphone may be centrally located between the first and second row of seats (e.g., rear overhead console).

The microphones may be electrically connected to the CPU 103. The CPU 103 may be programmed to sample and process the signals from the microphones. The CPU 103 may be programmed to implement various voice recognition algorithms. The CPU 103 may alter the sampling and processing of the signals based on the mode of operation (driver or group mode). For example, in the driver mode, only the microphone input configured to provide the driver input is sampled and processed. In the group mode, all of the microphone inputs may be sampled and processed. In the case of a call, processing may include passing the voice signal through the communication system. In driver mode, only the driver microphone input may be output to the communication link. In the group mode, all of the microphone inputs may be combined and output to the communication link. In other modes of operation, processing may include recognizing voice commands. The voice commands may be used to activate various vehicle features (e.g., initiate a call, change cabin temperature, change radio station).

The microphones may be in wireless communication with the CPU 103. For example, the microphones may be configured to communicate via the BLUETOOTH protocol through the BLUETOOTH transceiver 115. The microphones may include a BLUETOOTH transceiver that may be paired with the CPU 103 through the vehicle BLUETOOTH transceiver 115. In a similar manner, the microphones may communicate via other wireless channels and protocols (e.g., wireless Ethernet network). In a wireless microphone configuration, the microphones may sample and digitize the sound signals and send the digitized signals over the wireless network. In some configurations, multiple microphones may be configured to communicate over a single BLUETOOTH channel. For example, a wireless communication module may be coupled to multiple microphones and the sound signals for all of the microphones may be communicated over a single wireless link or connection. The wireless communication module associated with the microphones may be configured to receive commands from the CPU 103. For example, the CPU 103 may send commands to enable and disable a given microphone signal.

Enabling or activating the microphones may include actively processing the signals received from the microphone. When a microphone is disabled or deactivated, the signals may be received but not processed by the CPU 103. Enabling or activating the microphones may also include enabling hardware circuits (e.g., amplifier, power supply) associated with the microphone. Enabling the microphone may allow the microphone signal to be provided to the CPU 103. When disabled or deactivated, the microphone signal may be isolated from the CPU 103.

Figure 4:
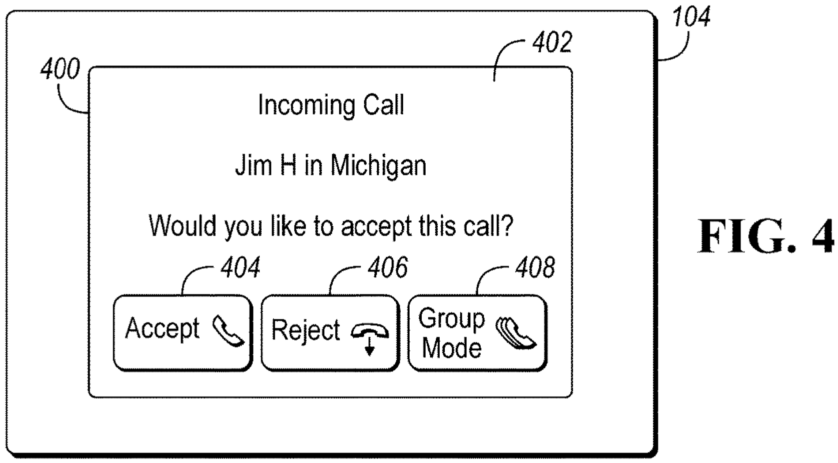
FIG. 4 is a possible user interface for an infotainment system display for receiving incoming calls.

The CPU 103 may be programmed to determine when the communication system is to be placed into group mode. FIG. 4 depicts a possible user interface for selecting the group mode of communications. The selection of group mode may be incorporated into a user interface. The user interface may be implemented on a touch-screen display (e.g., 104). Responsive to an incoming call, a pop-up window 400 may be displayed on the screen 104. The pop-up window 400 may include an information display area 402 for displaying information about the incoming or outgoing call. The pop-up window 400 may include several virtual buttons that may be selected by touch. An accept button 404 may be displayed that causes the call to be answered in driver mode. A reject button 406 may be displayed that causes the call to be rejected or not answered. A group mode button 408 may be displayed that causes the call to be answered in group mode. For example, pressing the group mode button 408 in response to an incoming call may select the group mode of operation. In the group mode of operation, the CPU 103 may enable the microphones to selectively provide sound signals from all of the seating positions. The group mode may be selected by directly pressing the group mode button 408 and/or highlighting and selecting the button using the multifunction buttons 220.

Figure 5:
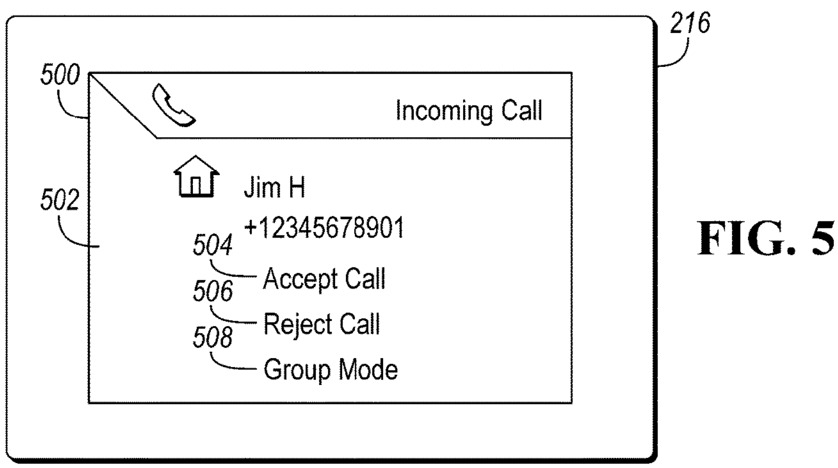
FIG. 5 is a possible user interface for an instrument cluster display for receiving incoming calls.

FIG. 5 depicts a possible user interface for selecting the group mode of communication from the instrument cluster display 216. An information window 500 may be displayed on the instrument cluster display 216. The information window 500 may be displayed responsive to receiving an incoming call. The information window 500 may display information about the call such as caller name and phone number. The information window 500 may display a list of options including an accept call selection 504, a reject call selection 506, and a group mode selection 508. The various selections may be made by navigating with the multifunction switch 220. For example, pressing a down arrow may cause a selection highlight to move down the list. Pressing an up arrow may cause the selection highlight to move up the list. Pressing the central button (e.g., OK button) may cause the presently highlighted selection to be selected.

The user interface may include a call button 218 (e.g., on the steering wheel). Normally, when pressing the call button 218, an incoming call is answered or an outgoing call is initiated. Operation of the call button 218 may be modified to incorporate the group mode feature. For example, by holding the call button 218 for a duration of time exceeding a predetermined time, the call may be answered in group mode. Pressing the call button 218 for a duration less than the predetermined time may cause the call to be answered in driver mode. As another example, double pressing the call button 218 may cause the call to be answered in group mode. Double pressing may be detected by monitoring the number of presses of the call button 218 over a predetermined time interval.

Figure 6:
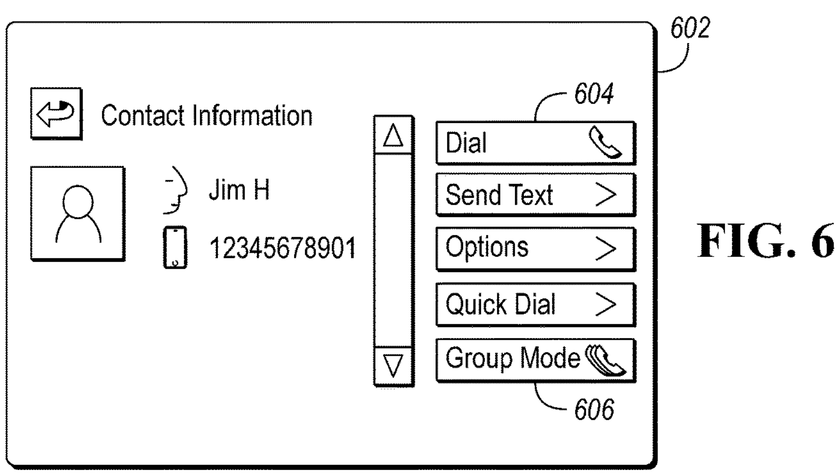
FIG. 6 is a possible user interface for initiating a call.

Outgoing calls may be placed in the driver mode or the group mode. FIG. 6 depicts a possible user interface for placing an outgoing call. An outgoing call window 602 may be displayed on the infotainment display 104 or the instrument cluster display 216. The user interface may include a dial selection 604 that, when selected, causes the outgoing call to be made in the driver mode. The user interface may include a group mode selection 606 that, when selected, causes the outgoing call to be made in group mode. Selecting the group mode selection 606 may be done by directly touching the group mode selection 606 and/or highlighting the group mode selection 606 using the multifunction buttons 220.

The outgoing call may also be made in group mode by holding the call button for a time period exceeding a predetermined time. Pressing the call button for a time period less than the predetermined time may cause the call to be made in driver mode. Another example may include double pressing the call button. Additionally, the outgoing call may be placed in group mode using a voice command. For example, a command such as "Call TBD in group mode" may be added to a list of recognized commands. An additional command may include "Call TBD in driver mode" which cause the call to be made in driver mode. The CPU 103 may be programmed to recognize and respond to the voice commands.

The selection between the driver and group modes may also be performed automatically based on other inputs. The occupancy sensor inputs may be used to determine which microphones are enabled for communication. In a system having an occupancy sensor in each seating position, the CPU 103 may be programmed to enable only those microphone inputs from the occupied seating positions. This prevents processing of microphone inputs from unoccupied seating positions and may improve overall clarity of the group call.

Once in a call, the system may provide an option to transition between the group and driver modes. For example, during the call, the user interface may include a button that enables a transition to the other mode. For example, if the call is presently in driver mode, a group mode button may be displayed. If the call is presently in group mode, a driver mode button may be displayed.

In some configurations, virtual or actual buttons may be located near each seating position to enable transition between the driver and group modes. Autonomous vehicles may transport a number of people in unconventional seating arrangements. There may not necessarily be a person in the driver position. As such, it may be useful to allow the mode control selection at any seating position.

Figure 7:
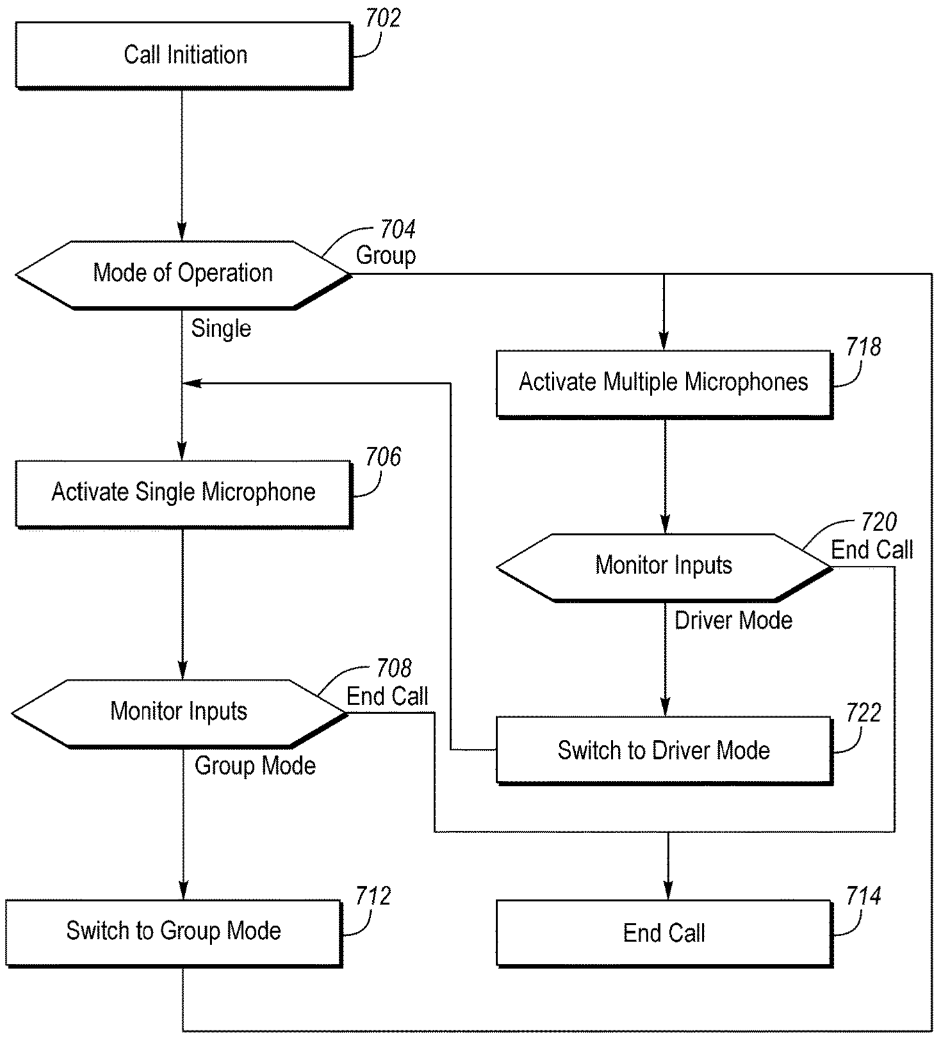
FIG. 7 is a possible flow diagram for a sequence of operations for receiving incoming calls.
Figure 8:
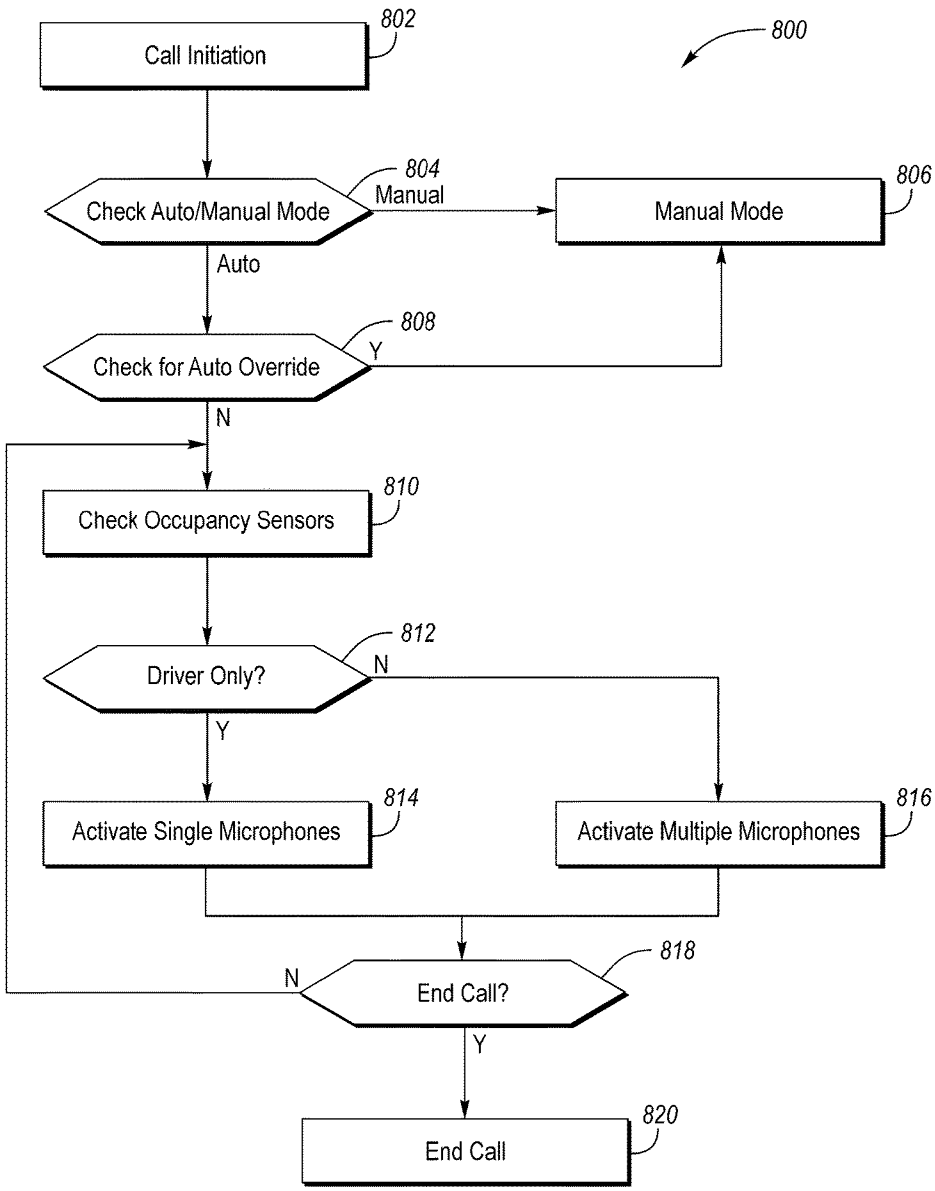
FIG. 8 is a possible flow diagram for a sequence of operations for automatically selecting group mode for calls.

FIG. 7 and FIG. 8 depict a flow diagrams for a sequence of operations that a controller, such as CPU 103, may be programmed to implement. Referring to FIG. 7, a first flow diagram includes logic for manually selecting the group mode or the driver mode upon call initiation. At operation 702, call initiation may be detected. This includes receiving an incoming call and initiating an outgoing call. At operation 704, a check is performed for the mode of operation of the communication system. The mode of operation may be driver mode or group mode. The mode of operation may be determined as described herein. For example, the group mode may be selected by selection of group mode from a display. The determination of the mode may also be determined by the duration of a switch press as described previously. The determination of the mode may also be based on a voice command.

If the mode of operation is the driver or single mode, operation 706 may be performed. At operation 706, a single microphone may be activated or enabled. The single microphone may be the microphone that is associated with the driver seating position. At operation 708, a check is performed for additional inputs and/or button presses. In response to an end call command, operation 714 may be performed. At operation 714, the call may be terminated and all microphones may be disabled.

At operation 708, if the additional input is indicative of a command to switch to the group mode, operation 712 may be performed. The mode switch may be detected based on a button or switch being pressed for a duration exceeding a predetermined duration. In some configurations, a virtual group mode button displayed as part of the user interface may be selected. At operation 712, the single microphone may be deactivated and the mode may be switched to group mode. Execution may then transfer to operation 718.

Operation 704 may also result in a transition to the group mode. If the mode of operation is the group mode, operation 718 may be performed. At operation 718, microphones associated with all of the seating positions in the vehicle may be activated or enabled. At operation 720, a check is performed for additional inputs and/or button presses. In response to an end call command, operation 714 may be performed. At operation 720, if the additional input is indicative of a command to switch to the driver mode, operation 722 may be performed. At operation 722, all of the microphones except the microphone associated with the driver seating position may be disabled or deactivated and the mode may be switched to the driver or single mode. Operation may then pass to operation 706 to transition to the single mode.

Referring to FIG. 8, a second flow diagram 800 includes logic for automatically entering the group mode based on occupancy sensor data. At operation 802, call initiation may be detected. This includes receiving an incoming call and initiating an outgoing call. At operation 804, a check may be performed to determine if the automatic mode of operation is enabled. For example, automatic operation may be a user-configurable option via the infotainment display 104. If the manual mode of operation is detected, operation 806 may be performed. At operation 806, the manual mode of operation is implemented and may be similar to operation as depicted in FIG. 7. In the manual mode of operation, the group/driver mode is determined based on operator inputs.

If the automatic mode of operation is detected, operation 808 may be performed. At operation 808, a check may be performed to determine any override conditions. For example, an override condition may include a change of mode based on a button or switch press by the operator. If an override condition is detected, operation 806 may be performed to operate in the desired mode. If no override condition is detected, operation 810 may be performed.

At operation 810, the occupancy sensors may be checked to determine which of the seating positions are occupied. Occupancy sensors may be sampled and processed to determine which seating positions are occupied. At operation 812, a check is performed to determine if the occupancy sensor data indicates that there is only a driver in the vehicle. If only a driver is detected, operation 814 may be performed to enter the driver mode. At operation 814, a single microphone associated with the driver position may be activated or enabled. Operation 814 may include deactivating multiple microphones if the mode has changed from group mode to driver mode. This allows the system to handle entry and exit of passengers during a call. If occupants are detected in the passenger or rear seating positions, operation 816 may be performed to enter the group mode. At operation 816, microphones associated with all of the seating positions may be activated or enabled.

At operation 818, instructions may be performed to check for the end of the call. For example, the system may monitor for pressing of an end call button. If the end of the call is detected, operation 820 may be performed to terminate the call. At operation 820, all microphones may be deactivated. If the call remains in progress, operation 810 may be repeated.

The system described provides advantages for calls involving multiple passengers in the vehicle. The system allows the group mode to be selected upon call initiation and/or automatically selected based on occupancy sensor data.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:

one or more microphones, each configured to selectively provide voice inputs from one or more of a plurality of seating positions; and a controller programmed to, responsive to receiving an input indicative of a request to enter a group conversation mode upon initiation of a call, change from using only microphone inputs associated with a driver position to combining microphone inputs associated with all seating positions as voice output for the call.

2. The vehicle of claim 1 further comprising a user interface configured to, upon initiation of the call, provide an operator with a selection for entering the group conversation mode, and provide the input according to the selection.

3. The vehicle of claim 1 further comprising a switch for initiating a call, and the request to enter the group conversation mode is responsive to the switch being pressed for a time exceeding a predetermined time.

4. The vehicle of claim 1 further comprising a plurality of occupancy sensors associated with each of the seating positions, and the request to enter the group conversation mode is responsive to more than one of the occupancy sensors being indicative of an occupant in a corresponding seating position.

5. The vehicle of claim 1 wherein the controller is further programmed to recognize voice commands and the request to enter the group conversation mode is responsive to receiving sound signals indicative of a command to enter the group conversation mode.

6. The vehicle of claim 1 wherein the controller is further programmed to, responsive to not receiving the request, enable only microphone inputs that are associated with the driver seating position.

7. The vehicle of claim 1 wherein the microphones are unidirectional microphones that are associated with each of the seating positions.

8. The vehicle of claim 1 wherein the microphones include at least one omnidirectional microphone that is configured to selectively provide voice inputs from one or more of the seating positions.

9. A vehicle communication system comprising:

a plurality of microphones installed in a vehicle and configured to provide sound signals from one of a plurality of seating positions; and a controller programmed to, responsive to a switch press, for initiating a call, exceeding a predetermined duration, change from enabling only one of the microphones associated with a driver position to enabling microphones associated with all seating positions for the call.

10. The vehicle communication system of claim 9 wherein the microphones include a unidirectional microphone that is associated with the driver position.

11. The vehicle communication system of claim 9 wherein the microphones include an omnidirectional microphone that is associated with seating positions other that the driver position.

12. The vehicle communication system of claim 9 wherein the controller is further programmed to, responsive to a second switch press, for changing a call mode, change from enabling microphones associated with all seating positions to enabling only one of the microphones associated with the driver position.

13. The vehicle communication system of claim 9 further comprising an occupancy sensor for each of the seating positions, and wherein the controller is further programmed to enable the microphones only for the seating positions in which the occupancy sensor indicates an occupant.

14. The vehicle communication system of claim 9 wherein the controller is further programmed to recognize voice commands and, responsive to receiving sound signals indicative of a command to enable microphones associated with all seating positions, change from enabling only one of the microphones associated with the driver position to enabling microphones associated with all seating positions.

15. The vehicle communication system of claim 9 further comprising a user interface in the vehicle configured to, upon initiating the call, provide an operator with a selection for enabling microphones associated with all seating positions, and, responsive to the operator choosing the selection, change from enabling only one of the microphones associated with the driver position to enabling microphones associated with all seating positions.

16. A method comprising:

enabling, by a controller, a driver-position microphone associated with a driver position of a vehicle responsive to a switch press;

receiving, by the controller, a voice command from the driver-position microphone and interpreting the voice command; and enabling, by the controller, microphones associated with seating positions other than the driver position responsive to the voice command being a request to initiate an outgoing call in a group mode.

17. The method of claim 16 further comprising enabling microphones associated with other seating positions responsive to a switch, for receiving an incoming call, being pressed for a duration exceeding a predetermined duration.

18. The method of claim 16 further comprising enabling microphones associated with other seating positions responsive to a switch, for initiating the outgoing call, being pressed for a duration exceeding a predetermined duration.

19. The method of claim 16 further comprising receiving, by the controller, occupancy sensor data associated with each of the seating positions and enabling microphones associated with seating positions at which the occupancy sensor data is indicative of an occupant.

20. The method of claim 16 further comprising receiving, by the controller, an input, from a user interface, indicative of a request to enter the group mode and enabling microphones associated with other seating positions responsive to the input.

* * * * *